(12) United States Patent
Nakano et al.

(10) Patent No.: US 11,708,279 B2
(45) Date of Patent: Jul. 25, 2023

(54) SELECTIVE MATERIAL RECOVERY FROM SOLUTION

(71) Applicant: Energy, United States Department of, Washington, DC (US)

(72) Inventors: Jinichiro Nakano, Albany, OR (US); Anna Nakano, Albany, OR (US); James P. Bennett, Salem, OR (US)

(73) Assignee: Energy, United States Department of, Washington, DC (US)

( * ) Notice: Subject to any disclaimer, the term of this patent is extended or adjusted under 35 U.S.C. 154(b) by 770 days.

(21) Appl. No.: 16/537,985

(22) Filed: Aug. 12, 2019

(65) Prior Publication Data

US 2021/0047196 A1  Feb. 18, 2021

(51) Int. Cl.
| | | |
|---|---|---|
| *C01D 15/08* | (2006.01) | |
| *C22B 7/00* | (2006.01) | |
| *C22B 26/12* | (2006.01) | |
| *C22B 59/00* | (2006.01) | |
| *C01F 17/247* | (2020.01) | |

(52) U.S. Cl.
CPC .......... *C01D 15/08* (2013.01); *C01F 17/247* (2020.01); *C22B 7/006* (2013.01); *C22B 26/12* (2013.01); *C22B 59/00* (2013.01)

(58) Field of Classification Search
CPC ....... C01D 15/08; C01F 17/247; C22B 7/006; C22B 26/12; C22B 59/00
USPC ....................................................... 423/21.1
See application file for complete search history.

(56) References Cited

U.S. PATENT DOCUMENTS

| | | | | |
|---|---|---|---|---|
| 4,036,713 A | * | 7/1977 | Brown | C25B 1/20 |
| | | | | 205/536 |
| 2004/0005267 A1 | * | 1/2004 | Boryta | C01F 5/22 |
| | | | | 422/600 |
| 2007/0160516 A1 | * | 7/2007 | Boryta | C01D 15/08 |
| | | | | 422/600 |
| 2011/0200508 A1 | | 8/2011 | Harrison et al. | |
| 2012/0100056 A1 | | 4/2012 | Harrison et al. | |
| 2013/0101484 A1 | * | 4/2013 | Perez | C01D 15/08 |
| | | | | 423/179.5 |
| 2017/0175229 A1 | * | 6/2017 | Wyrsta | C22B 3/28 |

(Continued)

FOREIGN PATENT DOCUMENTS

| | | | | |
|---|---|---|---|---|
| CA | 2313524 | | 11/2003 | |
| CN | 109019642 A | * | 12/2018 | ............. C01D 15/08 |

(Continued)

*Primary Examiner* — Melissa S Swain
(74) *Attorney, Agent, or Firm* — Aaron R. Keith; Felisa L. Leisinger; Michael J. Dobbs

(57) ABSTRACT

Embodiments relate to methods for generating selected materials from a natural brine, where the natural brine is sea water, saline water, fresh water, synthetic solutions, or industrial liquid wastes. A natural brine comprising at least a portion of a selected material is heated. $CO_2$ is added and mixes with the natural brine forming a mixture such that the $CO_2/P$ is a first predetermined value. The mixture is held so that impurities in the natural brine precipitate as solids leaving a second brine substantially comprising the selected material. The second brine is heated. $CO_2$ gas is injected into the second brine, mixing so that the $CO_2/P$ is a second predetermined value. The mixture is held so that the selected material precipitates out and are removed.

23 Claims, 5 Drawing Sheets

(56) References Cited

U.S. PATENT DOCUMENTS

2018/0200989 A1* 7/2018 Meyer .................. B32B 15/043
2018/0222761 A1* 8/2018 Nakano .................. C22C 24/00

FOREIGN PATENT DOCUMENTS

| KR | 1036553 B1 * | 5/2011 | ............ C01B 31/24 |
| WO | WO-2007130344 A2 * | 11/2007 | ............ B82Y 30/00 |
| WO | WO-2009070273 A1 * | 6/2009 | ............ B01D 47/04 |
| WO | 2010006366 | 1/2010 | |
| WO | WO-2010006366 A1 * | 1/2010 | ............ C01D 15/04 |
| WO | 2013036983 | 3/2013 | |

* cited by examiner

SELECTIVE MATERIAL RECOVERY FROM SOLUTION

STATEMENT OF GOVERNMENT SUPPORT

The United States Government has rights in this invention pursuant to an employer/employee relationship between the inventors and the U.S. Department of Energy, operators of the National Energy Technology Laboratory (NETL) and site-support contractors at NETL under Contract No.: DE-FE0004000.

TECHNICAL FIELD

This disclosure relates to a method of generating selected materials from a natural brine.

BACKGROUND

Natural geothermal brines are hydrothermal fluids heated by natural heat under the earth's surface. Natural geothermal brines are considered an environmentally preferred and renewable energy source. These brines contain materials leached from minerals while still underground. The current technology to generate materials from natural brines requires a series of football field-sized evaporation ponds, lengthy leaching processes that consume time (approximately 18-24 months) and energy, and that emit carbon dioxide ($CO_2$). During this evaporation, large quantities of diesel fuel are consumed producing carbon dioxide. After concentration of the selected materials through evaporation, the brines generally need to be transported a long distance to a processing plant that generates the selected compounds by multiple carbonation steps. This carbonation process requires various solid additives, including: soda ash ($Na_2CO_3$), lime (CaO), hydrochloric acid (HCl), organic solvent, sulfuric acid ($H_2SO_4$), and alcohol. Several tons of the combined additives may be required to produce a ton of selected material in these processes. Excluding land transit of the concentrated brine solutions, the current leading carbonation operation may consume more than 10 GJ/ton of $Li_2CO_3$ produced (equivalent to a cost of $208/ton of $Li_2CO_3$ production @ $0.07/kWh).

There is, therefore, a need for a method for generating selected materials from natural brines that requires less time, energy, and production costs versus existing technology.

SUMMARY

In one aspect, a method for generating selected materials from a natural brine. Heating a natural brine in a vessel to a first predetermined temperature. The natural brine comprises at least a portion of a selected material. Adding $CO_2$ into the vessel whereby the $CO_2$ mixes with the natural brine forming a mixture such that the $CO_2$/P ($CO_2$ mass over a total pressure within the vessel) is a first predetermined value. Holding the mixture for a first predetermined time after the $CO_2$ addition such that a solid is precipitated from the mixture. Separating the precipitated solid from the mixture, leaving a second brine substantially comprising the selected material. Heating the second brine to a second predetermined temperature. Adding $CO_2$ into the vessel whereby the $CO_2$ mixes with the second brine forming a second mixture such that the $CO_2$/P is a second predetermined value. Holding the second mixture for a second predetermined time after the $CO_2$ addition such that the selected material is precipitated from the second mixture. Removing the selected material precipitate.

In another aspect, a method for generating selected materials from a natural brine. Heating a natural brine in a vessel to a first predetermined temperature. The natural brine comprises at least a portion of a selected material. Adding $CO_2$ into the vessel whereby the $CO_2$ mixes with the natural brine forming a mixture such that the $CO_2$/P ($CO_2$ mass over a total pressure within the vessel) is a first predetermined value. Holding the mixture for a first predetermined time after the $CO_2$ addition such that a solid is precipitated from the mixture. Removing the selected material precipitate.

BRIEF DESCRIPTION OF THE DRAWINGS

These and other features, aspects, and advantages of the multiple embodiments of the present invention will become better understood with reference to the following description, appended claims, and accompanied drawings where:

DETAILED DESCRIPTION OF THE INVENTION

Figure 1:
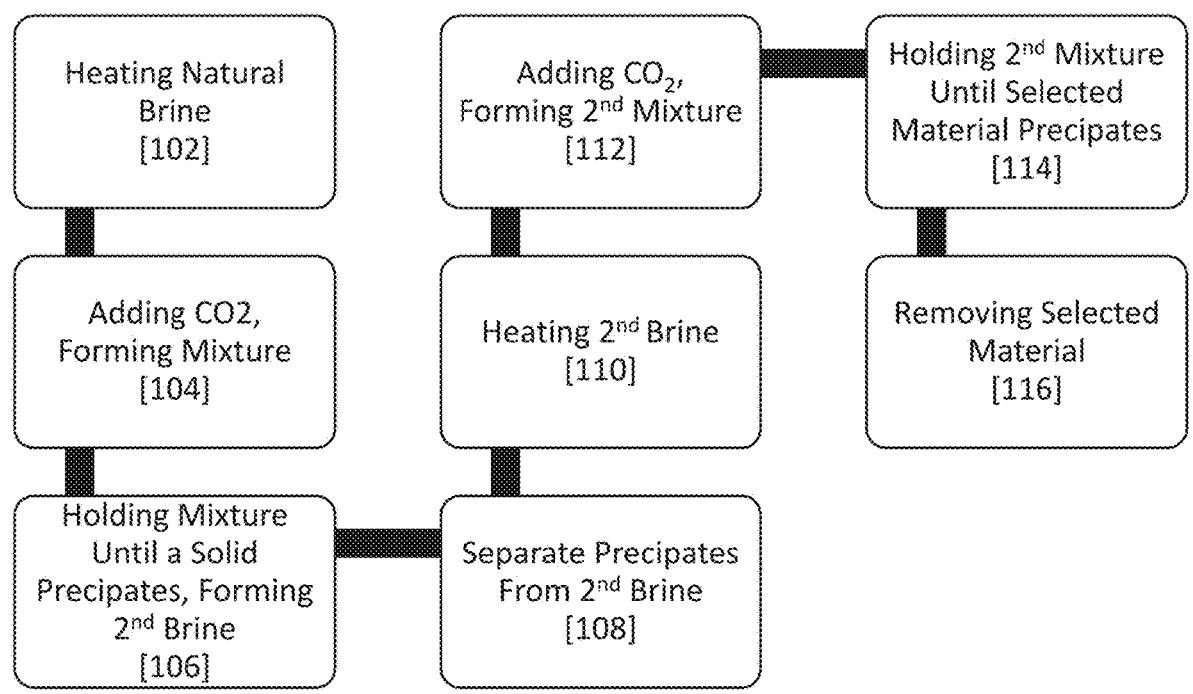
FIG. 1 is a schematic flow diagram illustrating the steps in accordance with one embodiment of the present invention's process.

Referring to FIG. 1, an embodiment of a method for generating selected materials from a natural brine is illustrated and comprises eight steps. Heating 102 a natural brine in a vessel to a first predetermined temperature. The natural brine comprises at least a portion of a selected material. Adding 104 $CO_2$ into the vessel whereby the $CO_2$ mixes with the natural brine forming a mixture such that the $CO_2$/P ($CO_2$ mass over a total pressure within the vessel) is a first predetermined value. Holding 106 the mixture for a first predetermined time after the $CO_2$ addition such that a solid is precipitated from the mixture. Separating 108 the precipitated solid from the mixture, leaving a second brine substantially comprising the selected material. Heating 110 the second brine to a second predetermined temperature. Adding 112 $CO_2$ into the vessel whereby the $CO_2$ mixes with the second brine forming a second mixture such that the $CO_2$/P is a second predetermined value. Holding 114 the second mixture for a second predetermined time after the $CO_2$ addition such that the selected material is precipitated from the second mixture. Removing 116 the selected material precipitate.

In the illustrated embodiment, the first step is to heat 102 a natural brine in a vessel to a first predetermined temperature. In one or more embodiments, the natural brine is sea water, saline water, freshwater, synthetic solutions, or industrial liquid waste containing the selected material. The natural brine comprises at least a portion of a selected material. A vessel is any hollow container used to hold a liquid. In one or more embodiments the vessel is capable of holding a high pressure within the vessel, or is capable of holding a high temperature, or is capable of holding a high pressure within the vessel and temperature. In a preferred embodiment, the vessel is a pressure vessel. In one or more embodiments, the first predetermined temperature is at least 200° C. In other embodiments, the first predetermined temperature is equal to or greater than 260° C. In an embodiment the selected material is lithium. In another embodiment, the selected material is a rare earth element or comprises a rare earth element. In another embodiment, other desired materials may be generated from a natural brine.

In the illustrated embodiment, the second step is adding 104 $CO_2$ into the vessel. When the $CO_2$ is added to the vessel it mixes with the natural brine forming a mixture. The mixture has a $CO_2/P$ ($CO_2$ mass over a total pressure within the vessel) that is a first predetermined value. In an embodiment, the $CO_2/P$ is greater than 6 g/atm. In another embodiment, the $CO_2/P$ is greater than 18 g/atm. The mixture has the inherent properties including a pressure, temperature, and surface energy. In one or more embodiments the pressure, temperature, and surface energy are adjusted to recover the selected material. In other embodiments, the $CO_2$ is added into the natural brine to form a mixture rather than prior art methods of pumping $CO_2$ into the brine.

As used herein, "adding" means $CO_2$ is introduced into the natural brine with simultaneous adjustment of interior pressure within the vessel, which enables the control of the total pressure with respect to the mass of $CO_2$, i.e., the $CO_2/P$ ratio can be maintained at a constant targeted value when mixed. As used herein, prior art "pumping" of $CO_2$ causes a pressure build up inside the vessel. Adding $CO_2$ to the natural brine while maintaining a first determined $CO_2/P$ allows for the highest dissolution that can be strategically achieved for the selected material. This is shown through ratios of $CO_2/P$ and by crossing over iso-pressure (constant pressure) contours in multiple dimensions consisting of all the parameters. Depending on the ratio of $CO_2$ to the $CO_2$ dissolved in the liquid, the effective $CO_2/P$ can change. The present invention, unlike prior art methods, allows for a higher $CO_2$ mass in solution without increasing P, or lowering P without decreasing $CO_2$, which tactically enables discovery of required thermodynamic domains where the selected material is stable or unstable. This enables high recovery rates of the selected material that are possible through control of the $CO_2/P$ parameter ranges.

Preferably, $CO_2$ is added in a way to maximize the $CO_2$ reaction surface area with the natural brine. In one or more embodiments, reactions may benefit from other properties such as surface tension and zeta potential. The $CO_2$ may come from natural, industrial, or waste sources. Natural brine treatment through $CO_2$ is preferential over prior art methods because it is a low cost additive with known process controls. In an embodiment, the $CO_2$ is a gas. In another embodiment, the $CO_2$ is a liquid. In an embodiment, substantially all the $CO_2$ added to the vessel is retained within the natural brine. In another embodiment, only a portion of the $CO_2$ added to the vessel is retained within the natural brine.

If the $CO_2$ is introduced to the natural brine as small spheroids or bubbles (<10 μm in diameter), surface properties of the $CO_2$ such as surface tension and zeta potential would promote local concentrations of $OH^-$, which increases as the $CO_2$ spheroids decrease in size; i.e., dissolution of $CO_2$ into the $OH^-$-rich region near the $CO_2$/brine interface facilitates the local formation of $HCO_3^-$. Ions of the selected materials would be attracted to the negativity of the $CO_2$ surface, which then promote the formation of such compounds. In this case, the generation process may be operated at relatively low temperatures, such as room temperature, and very low $CO_2/P$ values, such as 0.01 g/atm, would be sufficient to facilitate the precipitation of select materials.

The third step is holding 106 the mixture for a first predetermined time. The first predetermined time begins after the $CO_2$ injection and lasts for the length of time necessary such that impurities in the natural brine precipitate as solids. Preferably, the first predetermined time is greater than 20 minutes. This leaves the mixture substantially comprising dissolved selected material ions and dissolved chlorine ions.

In the illustrated embodiment, the fourth step is separating 108 the precipitated solids from the mixture. In an embodiment, the solid precipitate is impurities or byproducts. Separation is conducted with a separation device that is used to divide solid precipitate impurities or byproducts. In an embodiment, the separation device is any device that is capable of separating solids from liquids such as a sieve. In an embodiment, the mixture is moved into a second vessel to complete the step of separation 108. In an embodiment, the precipitated solids can be recycled or reused. In another embodiment, the precipitated solid is the selected material. In such embodiment, the method can continue to further separate selected materials from the mixture or stop.

In the illustrated embodiment, the fifth step is heating 110 the second brine to a second predetermined temperature. Embodiments include, the second predetermined temperature is at least 200° C. Other embodiments include that the second predetermined temperature is at least 200° C. In one or more other embodiments, the second predetermined temperature is equal to or greater than 260° C. In an example of another embodiment, the second predetermined temperature is equal to the first predetermined temperature.

In the illustrated embodiment, the sixth step is adding 112 $CO_2$ into the vessel. The $CO_2$ mixes with the second brine forming a second mixture such that the $CO_2/P$ is a second predetermined value. In an embodiment, the $CO_2/P$ is greater than 50 g/atm. Preferably, the $CO_2/P$ is greater than 200 g/atm. In an embodiment, the $CO_2$ is a gas. In another embodiment, the $CO_2$ is a liquid. In an embodiment, substantially all the $CO_2$ added to the vessel is retained within the natural brine. In another embodiment, only a portion of the $CO_2$ added to the vessel is retained within the natural brine.

If the $CO_2$ is introduced to the natural brine as small spheroids or bubbles (<10 μm in diameter), surface properties of the $CO_2$ such as surface tension and zeta potential would promote local concentrations of $OH^-$, which increases as the $CO_2$ spheroids decrease in size; i.e., dissolution of $CO_2$ into the $OH^-$-rich region near the $CO_2$/brine interface facilitates the local formation of $HCO_3^-$. Ions of the selected materials would be attracted to the negativity of the $CO_2$ surface, which then promote the formation of such compounds. In this case, the generation process may be operated at relatively low temperatures, such as room temperature, and very low $CO_2/P$ values, such as 0.01 g/atm, would be sufficient to facilitate the precipitation of select materials.

In the illustrated embodiment, the seventh step is holding 114 the second mixture for a second predetermined time after the $CO_2$ injection such that chlorine is suppressed and remains as dissolved ions while the selected material ions precipitate out as a carbonate and is substantially the only solid in the second mixture. Embodiments include that the second predetermined time is at least 3 minutes. Exemplary embodiments include that the second predetermined time is at least 20 minutes. In other embodiments, the second predetermined time is equal to the first predetermined time.

In the illustrated embodiment, the eighth step is removing 116 the selected material precipitate from the second mixture. Theoretically, recovery of the selected material is possible with a >99.0% purity. In an embodiment the purity of the selected material recovered is greater than 50%. In prior art methods, pumping $CO_2$ into brines at atmospheric pressure is known to simply acidify the solution. This dissolves various undesired materials into the solution and/or precipitate unwanted solids, making the selected material recovery more complex (minimally controllable) and less pure.

Figure 2:
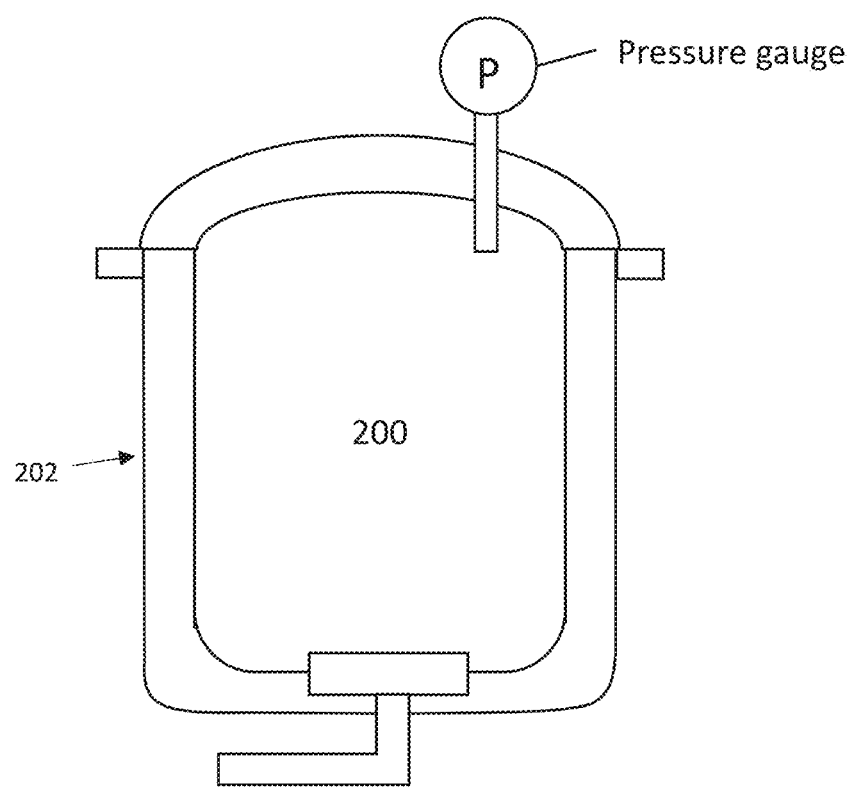
FIG. 2 illustrates a vessel used to treat a natural brine in accordance with one embodiment of the present invention.

Referring to FIG. 2, according to an embodiment of the present invention, a vessel 202 having a pressure gauge is used for generating selected materials from a natural brine 200. The natural brine 200 is heated from approximately 200 to 260° C. in vessel 202.

Figure 3:
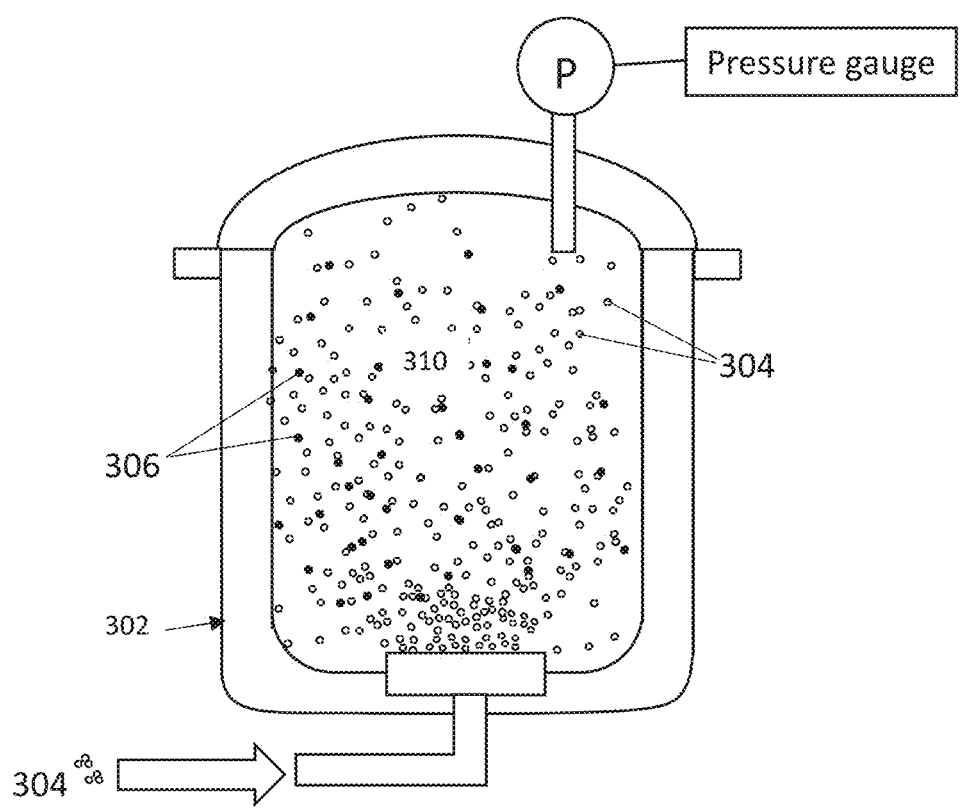
FIG. 3 illustrates $CO_2$ being added to a vessel in accordance with one embodiment of the present invention.

Referring to FIG. 3, according to an embodiment of the present invention, $CO_2$ 304 is added to a vessel 302. The $CO_2$ 302 mixes with the natural brine 306 to create a mixture 310 in such a way that $CO_2/P>6$ g/atm or preferably $CO_2/P>18$ g/atm. The mixture 310 is held under these conditions for first predetermined time. The first predetermined time, according to an embodiment, is approximately at least 3 minutes after $CO_2$ injection, or preferably longer than 20 minutes. At this stage, untargeted elements (impurities or byproducts), including, but not limited to K, Na, Ca, Mg, Ba, Fe, Al, and so on, from the brine, precipitate as solids while only selected material remain dissolved in the mixture 310.

Figure 4:
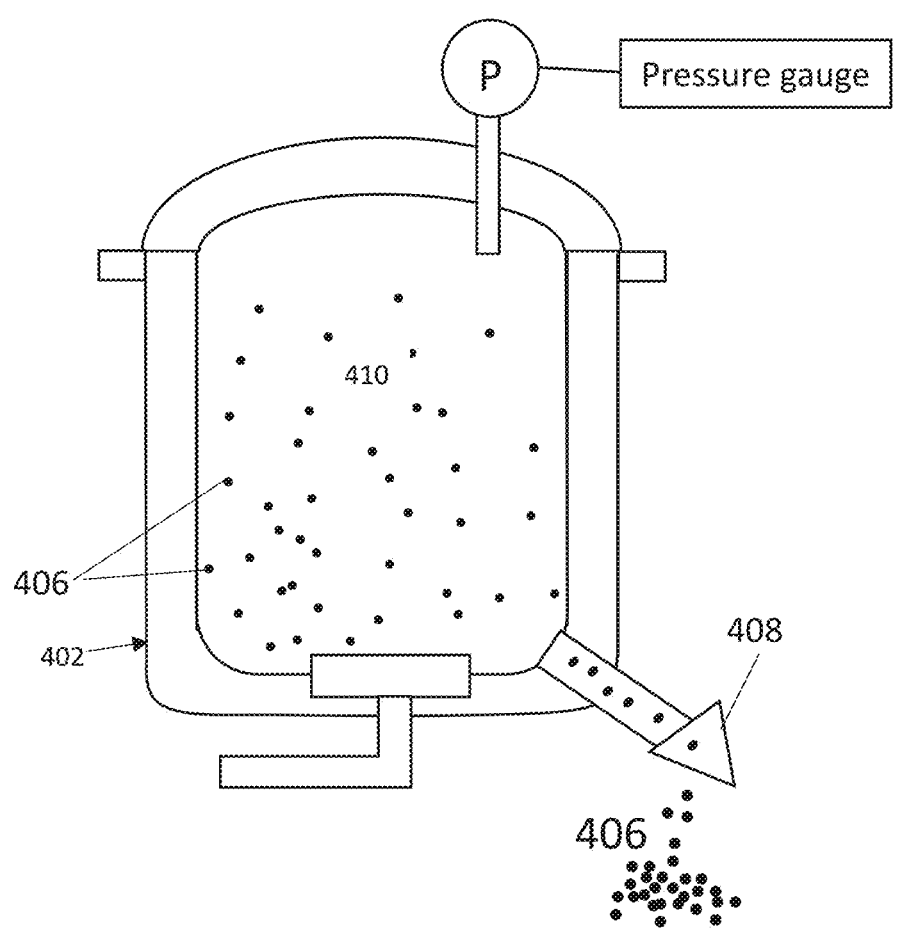
FIG. 4 illustrates precipitates being separated from the natural brine in accordance with one embodiment of the present invention.

Referring to FIG. 4, according to an embodiment of the present invention, within the vessel 402 the solid precipitates 406 are separated from the mixture 410 using a separation device 408. The total pressure within the vessel may be maintained until solid precipitate 406 separation 408 is complete to minimize solid dissolution back into the mixture 410. At this stage, the mixture 410 only substantially contains selected material ions.

Figure 5:
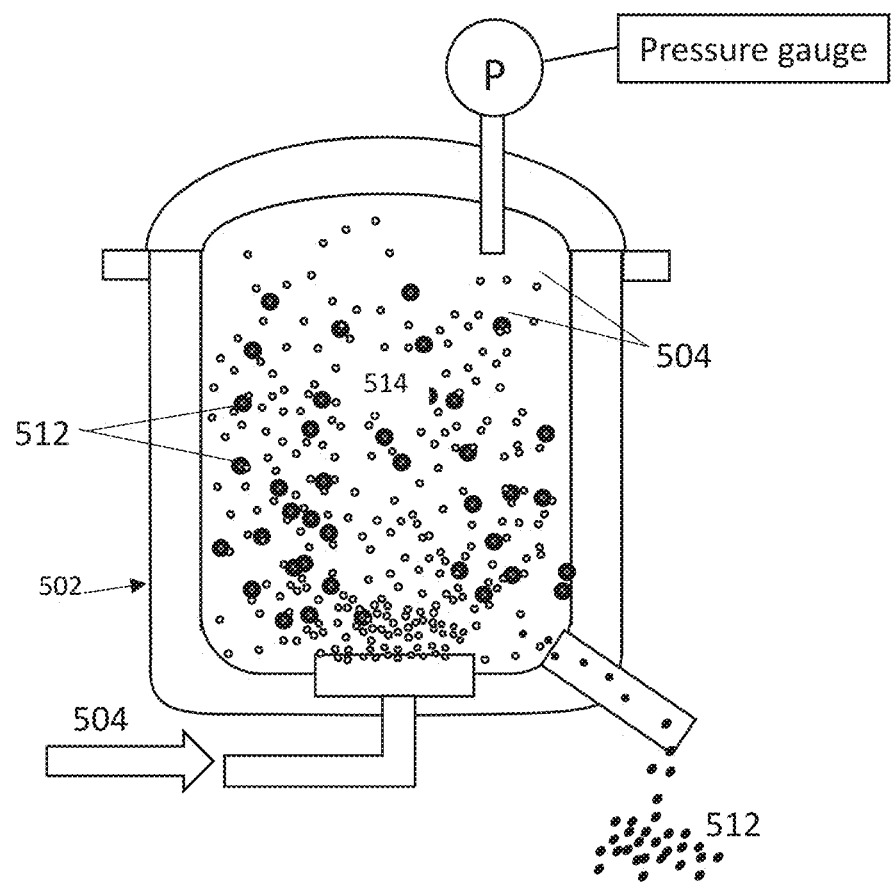
FIG. 5 illustrates selected material precipitates being removed from a mixture in accordance with one embodiment of the present invention.

Referring to FIG. 5, according to an embodiment of the present invention, $CO_2$ 504 is added into the vessel 502 to be mixed with the second mixture 514 at 260° C. in such a way that $CO_2/P>50$ g/atm, or preferentially >200 g/atm. The second mixture 514 is held under these conditions for a second predetermined time of at least 3 minutes after $CO_2$ 504 injection, or preferably longer than 20 minutes. At this stage, the selected material 512 precipitates out from the second mixture 514.

Embodiments may be integrated into existing geothermal power plants. Existing geothermal power plants pump out brines for power generation from which selected materials can be generated. Additionally, the process generates excess heat while concentrating the selected material and producing the selected material, which can be used for power generation.

Having described the basic concept of the embodiments, it will be apparent to those skilled in the art that the foregoing detailed disclosure is intended to be presented by way of example. Accordingly, these terms should be interpreted as indicating that insubstantial or inconsequential modifications or alterations and various improvements of the subject matter described and claimed are considered to be within the scope of the spirited embodiments as recited in the appended claims. Additionally, the recited order of the elements or sequences, or the use of numbers, letters or other designations therefor, is not intended to limit the claimed processes to any order except as may be specified. All ranges disclosed herein also encompass any and all possible sub-ranges and combinations of sub-ranges thereof. Any listed range is easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as up to, at least, greater than, less than, and the like refer to ranges which are subsequently broken down into sub-ranges as discussed above. As utilized herein, the terms "about," "substantially," and other similar terms are intended to have a broad meaning in conjunction with the common and accepted usage by those having ordinary skill in the art to which the subject matter of this disclosure pertains. It should be understood by those of skill in the art who review this disclosure that these terms are intended to allow a description of certain features described and claimed without restricting the scope of these features to the exact numerical ranges provided. Accordingly, the embodiments are limited only by the following claims and equivalents thereto.

We claim:

1. A method for generating selected materials from a natural brine, comprising:
adding $CO_2$ to a vessel containing a natural brine whereby the $CO_2$ mixes with the natural brine forming a mixture such that the $CO_2/P$ is a first predetermined value, wherein the $CO_2$ is added as bubbles with diameters less than 10 µm, wherein the natural brine comprises at least a portion of a selected material, wherein the natural brine is sea water, saline water, fresh water, synthetic solutions, or industrial liquid waste;
holding the mixture for a first predetermined time after the $CO_2$ addition such that a solid is precipitated from the mixture;
separating the precipitated solid from the mixture, leaving a second brine substantially comprising the selected material;
adding $CO_2$ into the vessel whereby the $CO_2$ mixes with the second brine forming a second mixture such that the $CO_2/P$ is a second predetermined value, wherein the $CO_2$ is added as bubbles with diameters less than 10 µm;
holding the second mixture for a second predetermined time after the $CO_2$ addition such that the selected material is precipitated from the second mixture; and
removing the selected material precipitate, wherein the method is performed at room temperature.

2. The method for generating selected materials from a natural brine of claim 1, wherein the step of holding the second mixture for a second predetermined time comprises:
adjusting the pressure, temperature, or surface energy of the natural brine.

3. The method for generating selected materials from a natural brine of claim 1, wherein the selected material is lithium.

4. The method for generating selected materials from a natural brine of claim 1, wherein the selected material is a rare earth element.

5. The method for generating selected materials from a natural brine of claim 1 wherein the first predetermined value is greater than 18 g/atm.

6. The method for generating selected materials from a natural brine of claim 1 wherein the second predetermined value is greater than 200 g/atm.

7. The method for generating selected materials from a natural brine of claim 1 wherein the first predetermined temperature is equal to or greater than 260° C.

8. The method for generating selected materials from a natural brine of claim 1 wherein the $CO_2$ is a gas.

9. The method for generating selected materials from a natural brine of claim 1 wherein said first predetermined time is longer than 20 minutes.

10. The method for generating selected materials from a natural brine of claim 1 whereby said step of separating the precipitated solid further comprises moving the mixture into a second vessel.

11. The method for generating selected materials from a natural brine of claim 1 whereby said step of separating the precipitated solid further comprises passing the mixture through a separation device.

12. The method for generating selected materials from a natural brine of claim 1 wherein said second predetermined temperature is equal to the first predetermined temperature.

13. The method for generating selected materials from a natural brine of claim 1 wherein said second predetermined time is at least 20 minutes.

14. The method for generating selected materials from a natural brine of claim 1 wherein the first predetermined temperature is room temperature.

15. The method for generating selected materials from a natural brine of claim 14 wherein the second predetermined temperature is room temperature.

16. The method for generating selected materials from a natural brine of claim 15 wherein the first predetermined value is 0.01 g/atm.

17. The method for generating selected materials from a natural brine of claim 16 wherein the second predetermined value is 0.01 g/atm.

18. The method for generating selected materials from a natural brine of claim 1 wherein the first predetermined value is 0.01 g/atm.

19. The method for generating selected materials from a natural brine of claim 18 wherein the second predetermined value is 0.01 g/atm.

20. A method for generating selected materials from a natural brine, comprising:
    adding $CO_2$ into a vessel containing a natural brine whereby the $CO_2$ mixes with the natural brine forming a mixture such that the $CO_2/P$ is 0.01 g/atm, wherein the natural brine is sea water, saline water, fresh water, synthetic solutions, or industrial liquid waste, and wherein the $CO_2$ is added as bubbles with diameters less than 10 µm, wherein the natural brine is room temperature;
    holding the mixture for a first predetermined time after the $CO_2$ addition such that a solid is precipitated from the mixture;
    separating the precipitated solid from the mixture, leaving a second brine substantially comprising the selected material;
    adding $CO_2$ into the vessel whereby the $CO_2$ mixes with the second brine forming a second mixture such that the $CO_2/P$ is 0.01 g/atm, wherein the $CO_2$ is added as bubbles with diameters less than 10 µm;
    holding the second mixture for a second predetermined time after the $CO_2$ addition such that the selected material is precipitated from the second mixture; and
    removing the selected material precipitate.

21. The method for generating selected materials from a natural brine of claim 20, wherein the selected material is lithium.

22. The method for generating selected materials from a natural brine of claim 20, wherein the selected material is a rare earth element.

23. The method for generating selected materials from a natural brine of claim 20 wherein the method is performed at room temperature.

* * * * *